June 6, 1972 — H. J. GARELICK — 3,667,728

SELF-LOADING DOLLY

Filed Aug. 21, 1970

INVENTOR
HERBERT J. GARELICK
BY
Mark W. Gehan
ATTORNEY

United States Patent Office 3,667,728
Patented June 6, 1972

3,667,728
SELF-LOADING DOLLY
Herbert J. Garelick, St. Paul, Minn., assignor to
Garelick Mfg. Co., St. Paul, Minn.
Filed Aug. 21, 1970, Ser. No. 65,796
Int. Cl. B62b 1/06
U.S. Cl. 254—8 R                         1 Claim

ABSTRACT OF THE DISCLOSURE

Apparatus for lifting a vehicle, such as a snowmobile, from the ground, whereby it may be transported or repositioned; said apparatus being easily operable by one person. The apparatus includes a U shaped handle assembly, the legs of which are spaced apart sufficiently far to comfortably span the width of a snowmobile. The tip of each leg is provided with a wheel assembly including an angularly formed structure which, in combination with a tie bar, functions to lift the snowmobile upwardly, when the handle assembly is depressed. In use, the apparatus is moved along the length of the snowmobile, with a wheel assembly on each side of the snowmobile. When the apparatus has been brought to a point just beyond the center of gravity of the snowmobile the tie bar is inserted through fittings on the wheel assembly. The front end of the snowmobile will then be lifted when the handle assembly is pressed downwardly. The rear end of the snowmobile may then be easily lifted and supported, off the ground, by attachment to the handle assembly.

---

This invention relates to an apparatus designed to move a vehicle (particularly a tracked vehicle, such as a snowmobile) to a particular place where it is to be used, or, for example, within a showroom where it is being displayed, so that the showroom area may be cleaned. The apparatus is "self-loading"; that is, no other machine is needed to put the vehicle onto the dolly, so that the vehicle may be moved. The apparatus could also be used to move objects other than a vehicle such as a platform upon which products are piled, usually to be moved by a forklift.

The apparatus (sometimes hereinafter referred to as a "dolly") is of extremely simple construction; is easy to assemble and to use, and may be made at low cost.

When unassembled, it may be packaged in a relatively small container, or stored within a small storage space.

By reason of its novel construction, and its use of the lever principle in an unusual manner, it provides means whereby just one person (even a child) is rendered capable of moving a heavy object such as a snowmobile.

Other objects and advantages of the invention will be apparent from the accompanying drawings, and the description which follows.

Referring first to the drawings.

Figure 1:
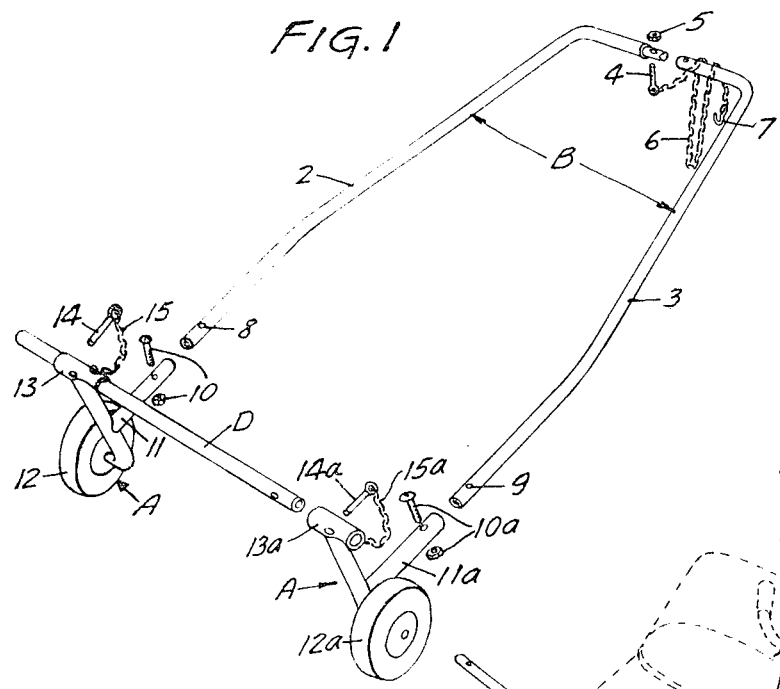
FIG. 1 is an exploded view of the apparatus showing the components thereof separated, but in position to be assembled.
Figure 2:
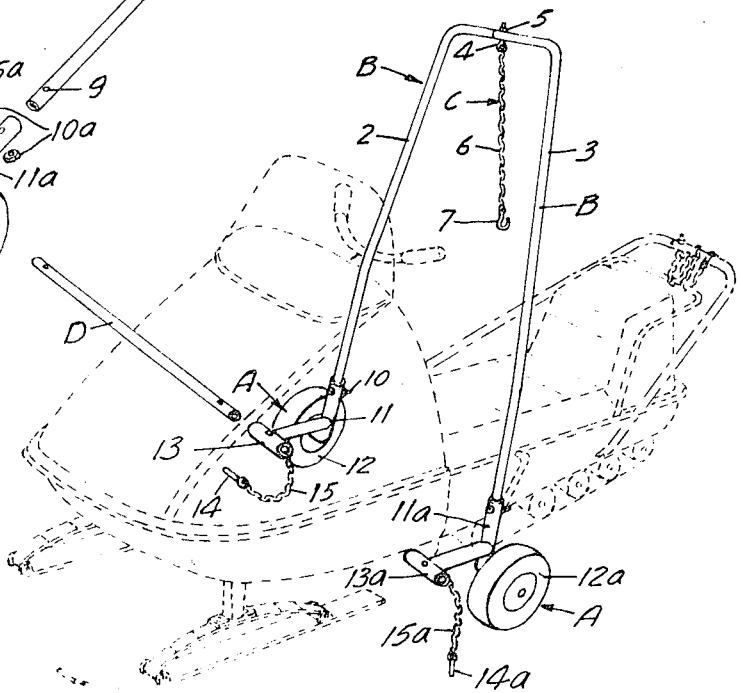
FIG. 2 is a perspective view of the apparatus; the snowmobile with which it is to be used being shown in ghost outline. The tie bar (which is hereinafter described) is not inserted in operating position in this view, but is included in the view to clarify the manner in which it cooperates with the remainder of the apparatus.
Figure 3:
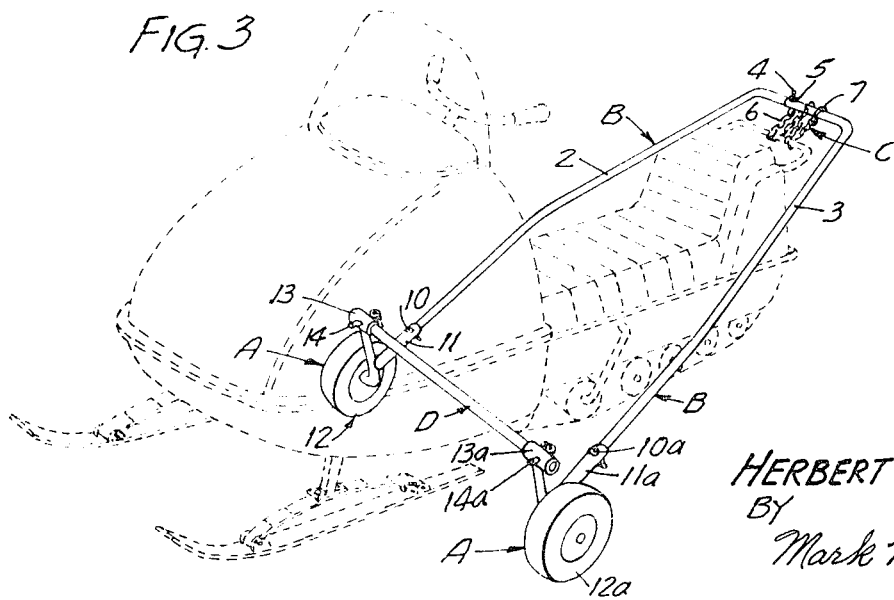
FIG. 3 is a perspective view of the apparatus (the "dolly") in operating position under a snowmobile, showing how the dolly is used to lift the snowmobile for transportation thereof, or for other purposes.

Referring now to the drawings in greater detail—like reference characters identifying like members—reference character B identifies the handle assembly forming part of the dolly. Assembly B is made up of two tubular, L-shaped members 2 and 3. The tip of the shorter arm of member 2, and the tip of the shorter arm of member 3, are designed (as by swaging) to mate, so that the two members may be assembled to form the U-shaped handle assembly B. Handle assembly B is preferably formed of the two members 2 and 3, but is not necessarily so formed. The use of two members, rather than one, does, however, permit the entire apparatus to be shipped in a smaller container, and to be more easily stored, etc.

Eye bolt and chain assembly C, is made up of elements 4, 5, 6 and 7 comprising, respectively, eye bolt 4, nut 5, of a size adapted to thread on the end of said eye bolt 4, chain 6, and hook 7 secured to one end of the chain. The other end of said chain is secured to the looped portion of eye bolt 4. The transverse segment of handle assembly B is provided with apertures through opposed portions of its periphery, so that eye bolt 4 may be inserted through the handle, and nut 5 thereupon mounted on the tip of the eye bolt.

Each of the longer arms of members 2 and 3, near the tip thereof, is formed with opposed openings 8 and 9 to join the handle assembly to the hereinafter described wheel assembly A.

The apparatus includes two of the above mentioned wheel assemblies A. Each of these wheel assemblies is made up of an angular tubular support, 11 and 11a, a bearing (not shown), and wheels 12 and 12a mounted for rotation on said bearing. As will be noted from the drawing, the bearing is located slightly above the apex of supports 11 and 11a, and wheels 12 and 12a are mounted on the bearing so that said wheels will lie along the outer faces of supports 11 and 11a when the apparatus is in use. Each of the wheel assemblies is of identical construction. Therefore, only one is specifically described. The second assembly, which is a mirror image of the first, has been given the same reference numbers with the addition of the letter *a* thereto.

One arm of each of the angular supports 11 and 11a is adapted to fit over the apertured longer arm of member 2 or member 3, as the case may be. The tips of the angular supports which are adapted to slide over the free ends of the handle assembly, are provided with apertures which will line up with the corresponding apertures, 8 and 9, in the free ends of members 2 and 3. Bolts 10 and 10a are inserted through the overlapped portions of the handle members and the angular supports to hold these members in fixed sleeve-like relation.

The second end of the supports 11 and 11a (which projects upwardly and forwardly) is provided at its tip with a horizontal fitting—extending at right angles to the support. These fittings 13 and 13a are hollow, and are adapted to receive tie bar D which is slipped horizontally through the fittings 13 and 13a to be supported at its ends by said fittings. Both of the fittings, and the tips of the tie bar, are formed with openings through which pin-like elements 14 and 14a may be inserted, thus securely holding the tie bar against displacement in a horizontal direction. If desired, said pins may be attached to wheel assembly A by chains 15 and 15a.

When handle assembly B is put together, the tips thereof, upon which wheel assemblies A are mounted, are spaced apart sufficiently far to comfortably span the width of a snowmobile.

When assembled, with the tie bar not in place, the apparatus resembles a large U with a wheel on each leg of the U.

In use, the apparatus is wheeled from one end of the snowmobile toward the other, with the tie bar not in place. A wheel proceeds along each side of the snowmobile during this operation. When the fittings 13 and 13a have been brought to a point just forward of the center of gravity of the snowmobile, the forward motion of the dolly is discontinued, and tie bar D is inserted through the fittings 13 and 13a in the manner above described.

The user of the dolly then manually depresses the handle assembly B whereby the front end of the snowmobile is raised by the tie bar D. In view of the fact that the tie bar is positioned just beyond the snowmobile's center of gravity, most of the weight of the snowmobile is carried by the tie bar. Although the rear end of the snowmobile rests on the ground, it may be very easily lifted so that chain 6, when looped through the rear handle of the snowmobile, and attached, by hook 7, to the dolly, will maintain the rear end of the snowmobile off the ground while it is being moved, etc.

It will be apparent, from the foregoing, that the weight of the snowmobile is carried by the frame resting on the tie bar. This is an extremely safe way of suspending the snowmobile. There is no strain put on a fender or any other individual part of the snowmobile. There is no way for the snowmobile to slip loose or drop from its suspended position. Furthermore, the dolly provides an effective means for storing a snowmobile for an extended period of time. When a snowmobile is not in use (as during the summer months, or while it is on display in a sales showroom) it is poor practice to let it stand on its tracks. The strain thus put on the tracks, and other parts of the vehicle, may serve to damage said parts—sometimes even to an extent which will make the vehicle inoperable. By use of my dolly, however, the snowmobile can be stored for months without any strain whatsoever being put on any part of the machine, except the frame which will hold the weight of the vehicle without any possibility of damage.

Numerous modifications in the particular structure described may be made without departing from the spirit and scope of my invention, and I intend to claim all structures which are the equivalent of those defined in the following claim.

What I claim is:

1. Apparatus for raising a snowmobile from the ground, and supporting it off the ground for movement or transportation, said apparatus being self-loading and being easily operable by one person and including a handle assembly, two wheel assemblies, and a tie bar; said handle assembly having legs substantially longer than the height of a snowmobile, said legs being spaced sufficiently far apart to span the width of a snowmobile, and a transverse segment connecting corresponding ends of said legs to maintain said legs in spaced-apart position; each wheel assembly having a wheel; one wheel assembly being mounted on each leg of the handle assembly near the free ends thereof; said apparatus having no obstructions or impediments between the legs of the handle assembly, whereby said apparatus may be wheeled from one end of the snowmobile to the other with a wheel assembly on each side of the snowmobile; each of said wheel assemblies being provided with a transverse, horizontal fitting adapted to receive said tie bar, said tie bar being adapted for insertion horizontally through said fittings from one side of the snowmobile to the other; said tie bar then lying close to the underside of the snowmobile and coming into upwardly pressing contact therewith when the handle assembly is depressed, said apparatus, in use, functioning leverlike to raise a portion of the snowmobile from the ground; fastening means being provided whereby the end of the snowmobile lying closest to the transverse segment of the handle assembly may be attached to the apparatus and be raised into suspended position off the ground; the entire snowmobile then being suspended on the apparatus, and easily transportable thereby.

References Cited

UNITED STATES PATENTS

| | | | |
|---|---|---|---|
| 2,870,928 | 1/1959 | Haggard et al. | 214—373 |
| 2,748,962 | 6/1956 | Murray | 214—373 |
| 3,356,239 | 12/1967 | Klein | 214—390 |
| 2,761,576 | 9/1956 | Sanborn | 214—373 |

ALBERT J. MAKAY, Primary Examiner

U.S. Cl. X.R.

214—373, 390; 254—131